US012750641B2

(12) United States Patent
Mukherjee et al.

(10) Patent No.: US 12,750,641 B2
(45) Date of Patent: Sep. 29, 2026

(54) METHODS, SYSTEMS, AND COMPUTER READABLE MEDIA FOR SERVICE AGGREGATION FOR ALTERNATE ROUTING OF CALLBACK MESSAGES

(71) Applicant: Oracle International Corporation, Redwood Shores, CA (US)

(72) Inventors: Abhishek Mukherjee, Bangalore (IN); Vivek Pant, Bangalore (IN); Virendra Pratap Singh, Sonebhadra (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 426 days.

(21) Appl. No.: 18/501,449

(22) Filed: Nov. 3, 2023

(65) Prior Publication Data

US 2025/0119712 A1 Apr. 10, 2025
US 2025/0386168 A9 Dec. 18, 2025

(30) Foreign Application Priority Data

Oct. 10, 2023 (IN) ............................. 202341067907

(51) Int. Cl.
*H04W 4/20* (2018.01)
*H04W 4/50* (2018.01)
*H04W 40/24* (2009.01)

(52) U.S. Cl.
CPC ............... *H04W 4/20* (2013.01); *H04W 4/50* (2018.02); *H04W 40/248* (2013.01)

(58) Field of Classification Search
CPC ........ H04W 4/20; H04W 4/50; H04W 40/248
See application file for complete search history.

(56) References Cited

U.S. PATENT DOCUMENTS 11,650,866 B2 * 5/2023 Landais ................ H04M 15/66 719/318
12,015,920 B2 * 6/2024 Bykampadi ........... H04L 9/3213
(Continued)

FOREIGN PATENT DOCUMENTS

EP 3855705 A1 * 7/2021 ............ H04L 67/51
KR 20190088878 A * 7/2019 ............ H04L 67/30
(Continued)

OTHER PUBLICATIONS

3rd Generation Partnership Project; Technical Specification Group Core Network and Terminals; 5G System; Technical Realization of Service Based Architecture; Stage 3 (Release 18) 3GPP TS 29.500 V18.3.0 pp. 1-148 (Sep. 2023).
(Continued)

*Primary Examiner* — Charles T Shedrick
(74) *Attorney, Agent, or Firm* — Jenkins, Taylor & Hunt, P.A.

(57) ABSTRACT

A method for service aggregation for alternate routing of callback messages includes registering, by an NF and with an NRF, an NF profile of the NF including an aggregated service name representing a plurality of different service types provided by the NF. The method further includes receiving, by the NF, requests from consumer NFs relating to the different service types. The method further includes obtaining, by the NF, and in response to the requests from the consumer NFs, resource information from a producer NF, re-using the resource information to respond to the requests, and communicating the aggregated service name to the producer NF as binding information. The method further includes maintaining, by the NF, a registered status of the aggregated service name with the NRF as long as any of the service types remain available at the NF.

20 Claims, 12 Drawing Sheets

(56) References Cited

U.S. PATENT DOCUMENTS

| | | | | |
|---|---|---|---|---|
| 2014/0181307 | A1* | 6/2014 | Lee | H04L 45/42 709/226 |
| 2020/0045753 | A1* | 2/2020 | Dao | H04W 4/08 |
| 2021/0235254 | A1* | 7/2021 | Farooq | H04W 8/005 |
| 2022/0053372 | A1* | 2/2022 | Shekhar | H04L 67/56 |
| 2022/0060547 | A1* | 2/2022 | Krishan | H04L 67/56 |
| 2023/0019209 | A1* | 1/2023 | Rajput | H04L 41/12 |
| 2023/0110726 | A1* | 4/2023 | He | H04L 43/20 370/254 |
| 2023/0261953 | A1* | 8/2023 | Lu | H04L 41/5054 709/223 |
| 2023/0284081 | A1* | 9/2023 | Krishan | H04W 28/0289 370/329 |
| 2023/0291818 | A1* | 9/2023 | Yang | H04L 67/563 |
| 2024/0069998 | A1* | 2/2024 | Chatterjee | G06F 9/5027 |
| 2024/0073095 | A1* | 2/2024 | Yang | H04L 41/0893 |
| 2024/0298196 | A1* | 9/2024 | Yang | H04W 76/19 |
| 2024/0406851 | A1* | 12/2024 | Jayaramachar | H04W 48/18 |
| 2025/0119712 | A1* | 4/2025 | Mukherjee | H04W 4/20 |
| 2026/0039567 | A1* | 2/2026 | Lu | H04L 41/5054 |

FOREIGN PATENT DOCUMENTS

| | | | | |
|---|---|---|---|---|
| WO | WO-2019034609 | A1 * | 2/2019 | H04W 8/20 |
| WO | WO-2020169337 | A1 * | 8/2020 | H04W 36/0033 |
| WO | WO-2020259652 | A1 * | 12/2020 | H04L 65/40 |
| WO | WO-2021017849 | A1 * | 2/2021 | H04W 60/04 |

OTHER PUBLICATIONS

3rd Generation Partnership Project; Technical Specification Group Core Network and Terminals; 5G System; Network Function Repository Services; Stage 3 (Release 18) 3GPP TS 29.510 V18.3.0 pp. 1-372 (Jun. 2023).

3rd Generation Partnership Project; Technical Specification Group Core Network and Terminals; 5G System; Spending Limit Control Service; Stage 3 (Release 18) 3GPP TS 29.594 V18.2.0 pp. 1-42 (Sep. 2023).

"3rd Generation Partnership Project; Technical Specification Group Core Network and Terminals; 5G System; Access and Mobility Management Services; Stage 3 (Release 18)", 3GPP TS 29.518, V18.3.0, pp. 1-448 (Sep. 2023).

* cited by examiner

METHODS, SYSTEMS, AND COMPUTER READABLE MEDIA FOR SERVICE AGGREGATION FOR ALTERNATE ROUTING OF CALLBACK MESSAGES

RELATED APPLICATIONS

This application claims the priority benefit of Indian patent application Ser. No. 202341067907 filed Oct. 10, 2023, the disclosure of which is incorporated herein by reference in its entirety.

TECHNICAL FIELD

The subject matter described herein relates to routing messages in a communications network. More particularly, the subject matter described herein relates to service aggregation for alternate routing of callback messages.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms “producer NF” and “NF service producer” are used interchangeably herein. Similarly, the terms “consumer NF” and “NF service consumer” are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF instance is an instance of a producer NF that provides a service. A given producer NF may include more than one NF instance. It should also be noted that multiple NF instances can share the same service endpoint.

NFs register with a network function repository function (NRF). The NRF maintains profiles of available NF instances identifying the services supported by each NF instance. The profile of an NF instance is referred to in 3GPP TS 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the type of service provided by an NF instance as well as contact and capacity information regarding the NF instance.

A service communication proxy (SCP) can also invoke the NF discovery service operation to learn about available producer NF instances. The case where the SCP uses the NF discovery service operation to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instances.

One problem that can occur in 5G and other types of networks is that the use of a service name that identifies a single service of an NF in binding information used for alternate routing may prevent discovery of the NF for alternate routing, even when some of the services of the NF are available. For example, a network function, such as a policy control function (PCF) or an access and mobility management function (AMF), that provides multiple services may use a single service name in 3gpp-Sbi-Binding headers transmitted by the NF to producer NFs that the producer NFs use to obtain alternate routing information. When one of the services provided by the NF becomes unavailable, the NRF marks the service as unavailable and will not return the NF profile of the NF in response to a discovery query from a producer NF identifying service name of the unavailable service, even though the other services are available. As a result, the producer NF will not be able to discover the NF for alternate routing of callback or notification messages.

Accordingly, there exists a need for improved methods, systems, and computer readable media for providing binding information usable for alternate routing.

SUMMARY

A method for service aggregation for alternate routing of callback messages includes registering, by a network function (NF) implemented using at least one processor and with an NF repository function (NRF), an NF profile of the NF including an aggregated service name representing a plurality of different service types provided by the NF. The method further includes receiving, by the NF, requests from consumer NFs relating to the different service types. The method further includes obtaining, by the NF and in response to the requests from the consumer NFs, resource information from a producer NF, re-using the resource information to respond to the requests, and communicating the aggregated service name to the producer NF as binding information. The method further includes maintaining, by the NF, a registered status of the aggregated service name with the NRF as long as any of the service types remain available at the NF.

According to another aspect of the subject matter described herein, the NF comprises a policy control function (PCF) and the plurality of different service types provided by the PCF include user equipment (UE) policy control, session management function (SM) policy control, and access and mobility management function (AM) policy control services.

According to another aspect of the subject matter described herein, registering the NF profile including the aggregated service name with the NRF includes registering the NF profile including the aggregated service name representing the UE, AM, and SM policy control service types.

According to another aspect of the subject matter described herein, communicating the aggregated service name as binding information to the producer NF includes communicating the aggregated service name representing the UE, AM, and SM policy control services as part of a 3gpp-Sbi-Binding header.

According to another aspect of the subject matter described herein, the requests from the consumer NFs comprise session creation requests, one of the session creation requests from one of the consumer NFs includes the aggregated service name and creating the sessions with the consumer NFs includes creating a session for the aggregated service name with the one consumer NF.

According to another aspect of the subject matter described herein, the requests from the consumer NFs comprise session creation requests for creating sessions with the NF for the different service types and obtaining the resource information from the producer NF includes creating a single subscription with the producer NF for the sessions with the consumer NFs.

According to another aspect of the subject matter described herein, re-using the resource information includes consuming a resource represented by the resource information based on usage by sessions with the consumer NFs.

According to another aspect of the subject matter described herein, the NF comprises an access and mobility management function (AMF) and the producer NF comprises a unified data management (UDM) function.

According to another aspect of the subject matter described herein, the producer NF comprises a charging function (CHF) and re-using the resource information includes re-using a policy counter provided by the CHF.

According to another aspect of the subject matter described herein, the producer NF comprises a unified data repository (UDR) and re-using the resource information includes re-using operator-specific subscriber data received from the UDR.

According to another aspect of the subject matter described herein, a system for service aggregation for alternate routing of callback messages is provided. The system includes a network function (NF) including at least one processor. The system further includes an aggregated services manager implemented by the at least one processor for registering, with a network function (NF) repository function (NRF), an NF profile of the NF including an aggregated service name representing a plurality of different service types provided by the NF, receiving requests from consumer NFs relating to the different service types, obtaining resource information from a producer NF, re-using the resource information to respond to the requests, and communicating the aggregated service name to the producer NF as binding information; and maintaining, a registered status of the aggregated service name with the NRF as long as any of the service types remain available at the NF.

According to another aspect of the subject matter described herein, the NF comprises a policy control function (PCF) and the plurality of different service types provided by the PCF include user equipment (UE) policy control, session management function (SM) policy control, and access and mobility management function (AM) policy control services.

According to another aspect of the subject matter described herein, the aggregated services manager is configured to register the NF profile including with the aggregated service name representing the UE, AM, and SM policy control service types.

According to another aspect of the subject matter described herein, the aggregated services manager is configured to communicate the aggregated service name as part of a 3gpp-Sbi-Binding header.

According to another aspect of the subject matter described herein, the requests from the consumer NFs comprise session creation requests and the aggregated services manager is configured to obtain the resource information by creating a single subscription with the producer NF for sessions with the consumer NFs.

According to another aspect of the subject matter described herein, the requests from the consumer NFs comprise session creation requests for creating sessions with the NF for the different service types, one of the session creation requests from one of the consumer NFs includes the aggregated service name and the aggregated services manager is configured to create a session for the aggregated service name with the one consumer NF.

According to another aspect of the subject matter described herein the NF comprises an access and mobility management function (AMF) and the producer NF comprises a unified data management (UDM) function.

According to another aspect of the subject matter described herein, the producer NF comprises a charging function (CHF) and the aggregated services manager is configured to re-use a policy counter provided by the CHF.

According to another aspect of the subject matter described herein, the producer NF comprises a unified data repository (UDR), and the aggregated services manager is configured to re-use operator-specific subscriber data received from the UDR.

According to another aspect of the subject matter described herein, a non-transitory computer readable medium having stored thereon executable instructions that when executed by a processor of a computer control the computer to perform steps is provided. The steps include registering, by a network function (NF) implemented using at least one processor and with an NF repository function (NRF), an NF profile of the NF including an aggregated service name representing a plurality of different service types provided by the NF. The steps further include receiving, by the NF, requests from consumer NFs relating to the different service types. The steps further include obtaining, by the NF, and in response to the requests from the consumer NFs, resource information from a producer NF, re-using the resource information to respond to the requests, and communicating the aggregated service name to the producer NF as binding information. The steps further include maintaining, by the NF, a registered status of the aggregated service name with the NRF as long as any of the service types remain available at the NF.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
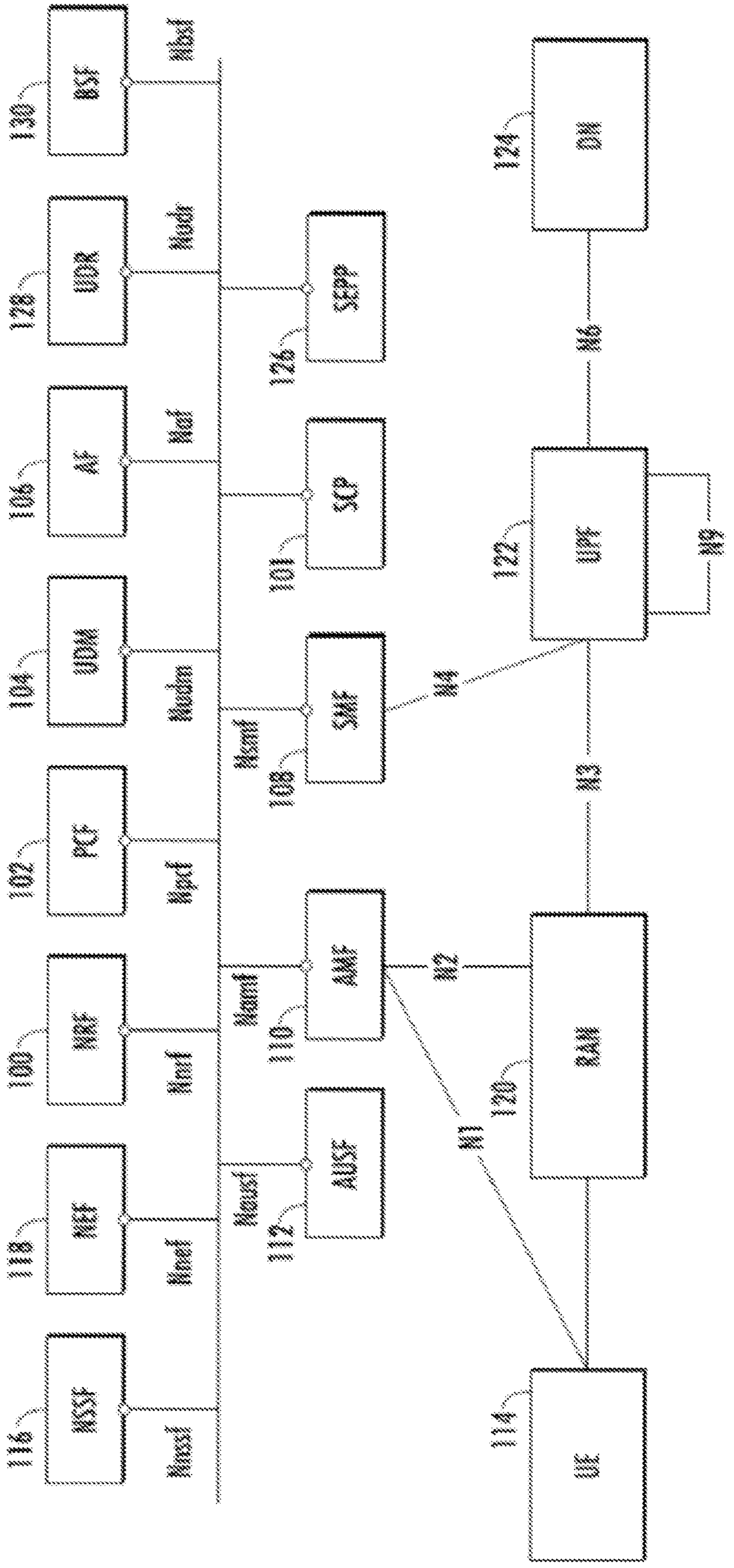
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for profiles of NF instances. To communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the type(s) of service(s) provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management function (UDM) 104 that manages user data, and an application function (AF) 106 that provides application services.

The NFs illustrated in FIG. 1 further include a session management function (SMF) 108 that manages sessions between an access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. NSSF 116 provides the NSSelection service, which allows NFs to request information about network slices and the NSSAIReachability service, which enables NFs to update and subscribe to receive notification of updates in network slice selection assistance information (NSSAI) reachability information.

A network exposure function (NEF) 118 provides application programming interfaces (APIs) for application functions seeking to obtain information about Internet of things (IOT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a gNB (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN. A unified data repository (UDR) 128 stores subscription data for UEs. A binding support function (BSF) 130 manages bindings between PDU sessions and PCFs.

Figure 2:
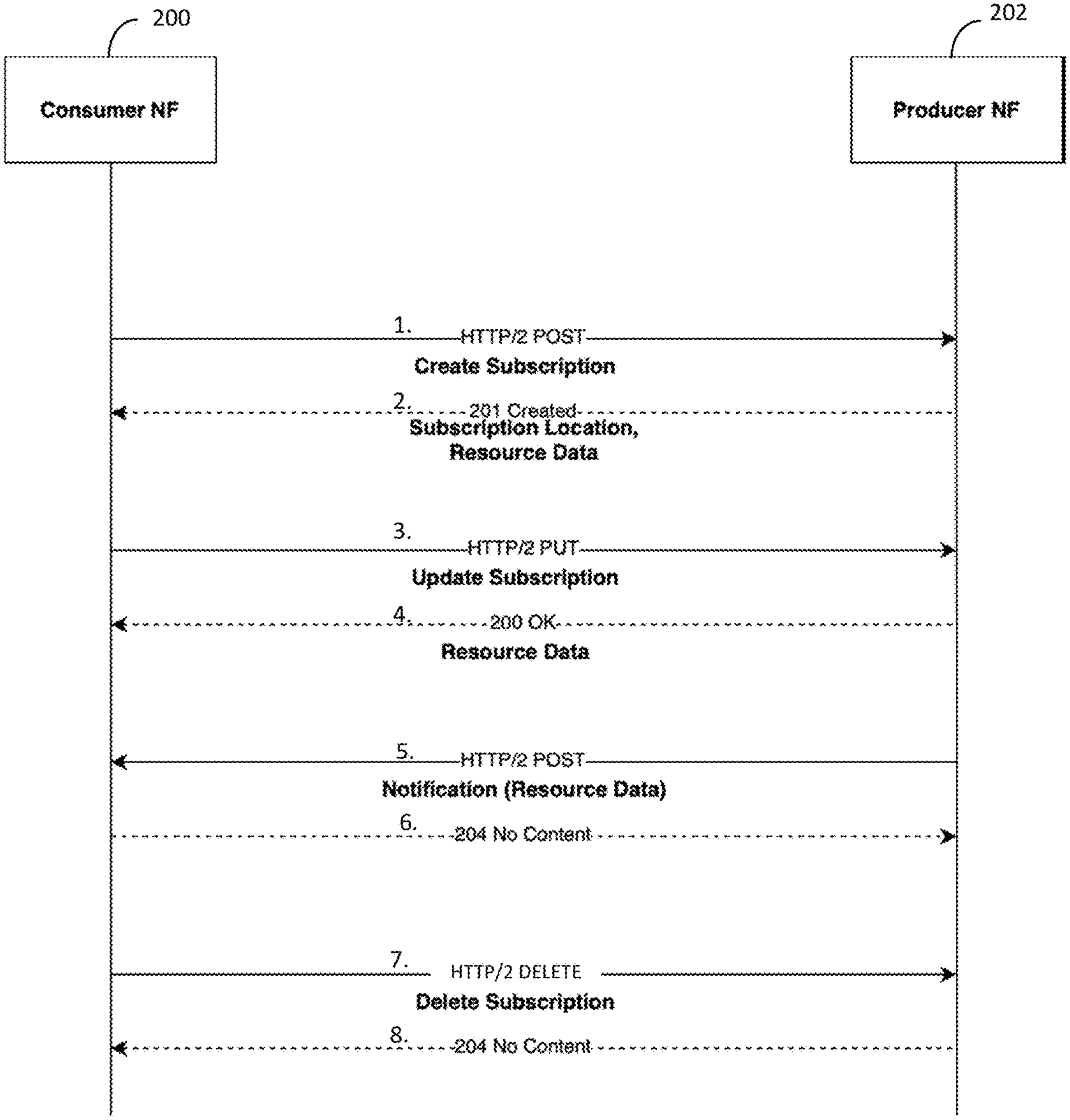
FIG. 2 is a message flow diagram illustrating exemplary messages exchanged between a consumer NF and a producer NF in a subscription and notification lifecycle.

As described above, one problem that can occur in 5G and other types of networks relates to using a single service name, i.e., a service name that identifies or represents a single service, in 3gpp-Sbi-Binding information for a producer NF that provides multiple services. To illustrate the problem and solution described herein, an overview of 3GPP communications, the use of the 3gpp-Sbi-Binding header, and alternate routing will now be described. FIG. 2 is a message flow diagram illustrating exemplary messages exchanged between a consumer NF and a producer NF in a subscription and notification lifecycle. In FIG. 2, in line 1, a consumer NF 200 creates a subscription with a producer NF 202 and receives, in line 2 and as part of the subscription, resource data and a subscription location. In line 3, consumer NF 200 updates the subscription by sending a subscription update message to producer NF 202. In line 3, producer NF 202 confirms the successful updating of the subscription. When producer NF 202 has information to provide to consumer NF 200 under the subscription, producer NF 202 sends, in line 5, a notification to consumer NF 200. Consumer NF 200 confirms successful receipt of the notification in line 6. To end the subscription, consumer NF 200 sends, in line 7, a delete subscription message to producer NF 202. In line 8, producer NF 202 confirms successful deleting of the subscription.

To add resiliency to network communication, 3GPP introduced alternate routing via the 3gpp-Sbi-Binding header. The 3gpp-Sbi-Binding header indicates binding information between NF and/or service instances. The binding information helps an HTTP client to re-route an HTTP message to an alternate destination if the HTTP client fails to deliver the message to the primary destination. The binding information is critical for success of re-routing of in-session HTTP messages (a.k.a. subsequent messages), because not all NF instances and/or service instances will share the resource and/or the subscription data. Thus, it is critical to send a re-routed message to a destination that shares the resource and/or the subscription data for the session for which the original delivery attempt failed.

Figure 3:
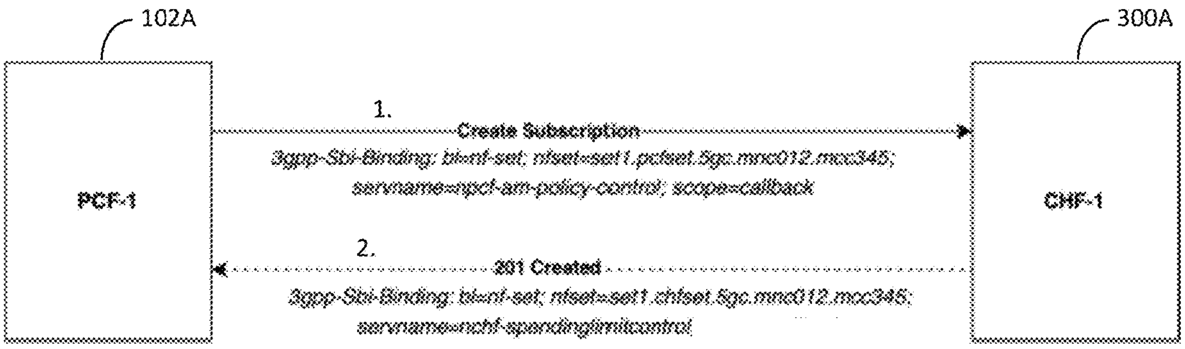
FIG. 3 is a message flow diagram illustrating the inclusion of the service name in 3gpp-Sbi-Binding headers in messages exchanged between a consumer NF and a producer NF.

FIG. 3 is a message flow diagram illustrating the inclusion of the service name in 3gpp-Sbi-Binding headers of messages exchanged between a consumer NF and a producer NF. In FIG. 3, PCF-1 102A, acting as the HTTP client, creates a subscription with CHF-1 300A acting as the HTTP server. To create the subscription, in line 1, PCF-1 102A sends a create subscription request to CHF-1 300A. PCF-1 102A includes a 3gpp-Sbi-Binding header in the create subscription request. The 3gpp-Sbi-Binding header includes a service name of npcf-am-policy-control, which identifies a single service provided by PCF-1, i.e., AMF (AM) policy control service. CHF-1 300A creates the subscription and returns a subscription response message in line 2 confirming successful creation of the subscription. In the subscription creation response message, CHF-1 300A also includes a 3gpp-Sbi-Binding header. The 3gpp-Sbi-Binding header created by CHF-1 300A includes a service name of nchf-spendinglimitcontrol, which identifies the spending limit control service provided by CHF-1 300A. It should be noted that the service names in the 3gpp-Sbi-Binding headers created by each of PCF-1 102A and CHF-1 300A each identify only a single service.

Figure 4:
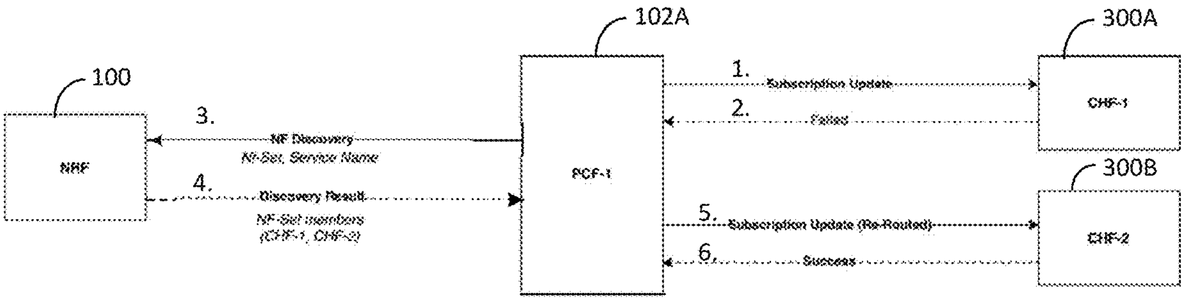
FIG. 4 is a diagram illustrating the use of binding information to re-route a subscription update to a mated CHF.

The 3gpp-Sbi-Binding headers exchanged in FIG. 3 can be used for alternate routing. FIG. 4 is a diagram illustrating the use of binding information to re-route a subscription update to a mated CHF. In FIG. 4, PCF-1 102A is the consumer NF and CHF-1 300A is the producer NF. In line 1, PCF-1 102A sends a subscription update to CHF-1 300A, and, in line 2, the subscription update fails. As a result of the failure, in line 3, PCF-1 102A sends, to NRF 100, an NF discovery request including the service name obtained from CHF-1 300A in the 3gpp-Sbi-Binding header of the subscription creation response message (see line 2 in FIG. 3). In line 4, NRF 100 responds with an NF discovery response message including NF profiles of NF set members CHF-1 300A and CHF-2 300B. In line 5, PCF-1 102A reroutes the subscription update to CHF-2 300B, because CHF-2 300B is an NF set mate of CHF-1 300A and thus has all of the state information regarding the subscription created with CHF-1 300A. In line 6, CHF-2 300B responds to the subscription update message indicating successful updating of the subscription.

The NF instances that form a binding are often referred to as mated pairs/triplets/quadruplets, etc., depending on the redundancy model being 2-site/3-site/4-site, respectively. The members of the binding or "mated" pair (considering a 2-site redundancy model) are identified using the NF discovery service operation as defined in 3GPP TS 29.510. In other words, HTTP clients (NF producers and/or consumers) may send a discovery request to the NRF to retrieve the members of a particular binding. The key to discovering a binding is the binding level and value along with the service name. The following is an example binding header:

$$3gpp\text{-}Sbi\text{-}Binding\text{: } bl = nf\text{-}set;\ nfset = set1.udmset.5gc.mnc012.mcc345;\ servname = nudm\text{-}ee;\ scope = subscription\text{-}events$$

In the example binding header, the binding level is nf-set, and the service name is nudm-ee. An NF can thus discover members of a UDM set that provide the nudm-ee service by sending an NF discovery request to the NRF specifying the NF set of set1 and the service name nudm-ee. However, if the service corresponding to the service name nudm-ee is unavailable, and the NRF receives an NF discovery request requesting discovery of members of NF set1 providing the nudm-ee service, the NF profile of the NF set member with the failed nudm-ee service would be excluded from NF discovery results, even if the NF set member provided other services that are available.

While the consumer NFs know the service name of the resource to which the consumer NFs subscribe, the producer NFs may not know the service name of the consumer NF. Thus, to enable discovery of consumer NF instances and/or service instances it is the responsibility of consumer NFs to provide the service name of the consumer service in the 3gpp-Sbi-Binding header when creating a subscription. Including the consumer NF service name in the 3gpp-Sbi-Binding header transmitted to the producer NF in a subscription request ensures that the producer NF is able to successfully discover an alternate destination from an indicated binding in the event of a delivery failure to the primary destination of a callback/notification message.

Figure 5:
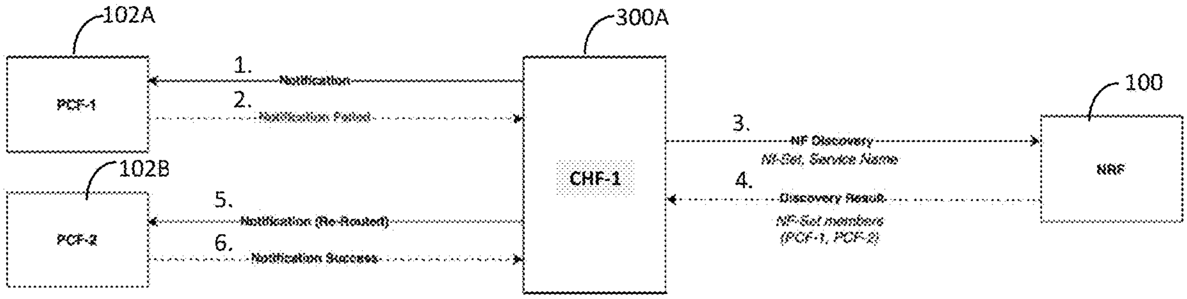
FIG. 5 is a diagram illustrating a re-routing attempt by the CHF when sending a message to the PCF.

FIG. 5 is a diagram illustrating a re-routing attempt by the CHF when sending a message to the PCF. In FIG. 5, PCF-1 102A and PCF-2 102B are the consumer NFs, and CHF-1 300A is the producer NF. In line 1, CHF-1 300A attempts to send a notification message to PCF-1 102, and, in line 2, the notification fails. In line 3, CHF-1 300A performs NF discovery with NRF 100 using the NF-Set name and service name provided by PCF-1 102A in the subscription creation request (see line 1 in FIG. 3). CHF-1 300A discovers NF set members PCF-1 102A and PCF-2 102B. Because the notification to PCF-1 102A failed, in line 5, CHF-1 300A re-routes the notification to PCF-2 102B. In line 6, PCF-2 102B responds to the notification indicating successful processing of the notification.

To illustrate the problem of using a service name that identifies a single service in the 3gpp-Sbi-Binding header, in one example, the PCF, acting as a consumer NF, needs to fetch policy counters from the CHF and use the policy counters to evaluate policies for SMF (SM) policy control, AMF (AM) policy control and UE policy control service session procedures. The PCF optimizes these policy counter fetch operations by fetching the policy counter from the CHF only once for the first service session that is established. Thereafter, the PCF stores the policy counter within its local database and reuses the policy counter for other services that require this information. 3GPP Release 16 requires the PCF to send a service name in the 3GPP-Sbi-Binding header to the CHF when the subscription create request is sent to CHF. Since the PCF uses resource data received from the CHF for more than one service, it is not accurate to provide a single service name in the binding indication. However, 3GPP does not allow multiple service names in the binding indication.

Figure 6:
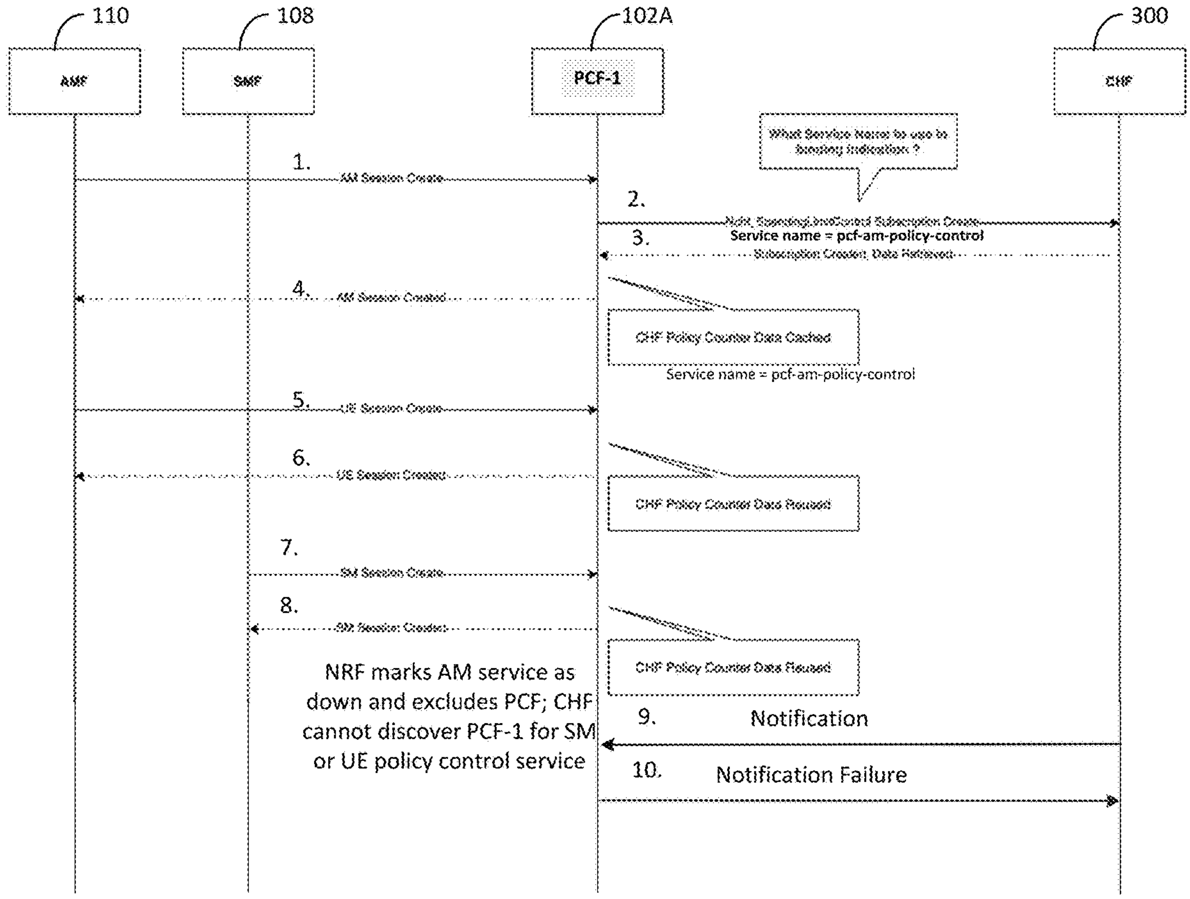
FIG. 6 is a message flow diagram illustrating the use of a single service name in a binding indication.

FIG. 6 is a message flow diagram illustrating the use of a service name that identifies a single service in a binding indication. In FIG. 6, in line 1, AMF 100 requests creation of an AM policy control session with PCF-1 102A. PCF-1 102A receives the request and transmits an Nchf_SpendingLimitControl subscription creation request to CHF 300. In the subscription creation request, PCF-1 102A includes a 3gpp-Sbi-Binding header with a service name identifying the single service, i.e., pcf-am-policy-control. CHF 300 creates the subscription and, in line 3, returns a subscription created message indicating successful creation of the subscription. PCF-1 102A receives the subscription created message from CHF 300, caches the policy counter, and, in line 4, sends an AM session created message to AMF 110.

In line 5, SMF 108 requests creation of a UE policy control session with PCF-1 102A. PCF-1 102A creates the session without a new subscription request to CHF 300. The reason a new subscription request is not required is that PCF-1 102A determines that the policy counter retrieved for the AM policy control session in line 3 can be re-used for the UE session. In line 6, PCF-1 102A responds to SMF 108 indicating successful creation of the UE policy control session.

In line 7, SMF 108 requests creation of an SM policy control session with PCF 102. PCF-1 102A creates the session without a new subscription request to CHF 300. The reason a new subscription request is not required is that PCF-1 102A determines that the policy counter retrieved for the AM policy control session in line 3 can be re-used for the SM session. In line 8, PCF-1 102A responds to SMF 108 indicating successful creation of the SM policy control session.

As indicated in FIG. 6, PCF-1 102A creates a single subscription with the CHF and must include a service name in the 3gpp-Sbi-Binding header in the subscription creation request message. If PCF-1 102A uses the service name of the first service that requests a subscription or uses any of the service names that consume the data, there will be a problem when PCF services are partially down.

For example, suppose PCF-1 102A uses the AM service name in the binding indication in the subscription request message transmitted to CHF 300. The data is fetched from CHF 300 and consumed by all three services of PCF-1 200A, i.e., the AM, UE, and SM policy control services. Subsequently, the AM policy control service of PCF-1 102A becomes unavailable, and the UE and SM services continue to be in an available state. In lines 9 and 10, a notification from CHF 300 to PCF-1 102A fails. Because of the failure, CHF 300 performs service discovery with the NRF (not shown in FIG. 6) using the AM policy control service name (as provided in the binding indication included in the subscription creation request message).

The NRF excludes PCF-1 102A, i.e., does not return the NF profile of PCF-1 102A in response to the NF discovery request, even though UE and SM services are still available and ready to consume the notification from CHF. Because PCF-1 102A is marked as unavailable with the NRF even though its SM and UE policy control services are available, unnecessary network latency may occur in trying to re-route UE and SM subscription-related messages to a PCF located in another site/geographic location.

To address the aforementioned problem with using a service name that identifies a single service in 3gpp-Sbi-Binding headers and NF profiles, the PCF provides a common or shared service name that identifies multiple services in the binding indication and in its NF profile registered with the NRF. The use of an aggregated service name that identifies multiple services is referred to herein as service aggregation. The PCF registers an aggregated (custom) service name with NRF that the PCF uses as the service name when communicating the binding indication to CHF. The aggregated service remains in the registered state with the NRF as long as one of the shared services (i.e., the services that make up the aggregated service) remains active. For example, if AM service is down but UE and SM services are still up, then the aggregated service remains in the registered state so that NRF can continue to include the NF instance in discovery results. The aggregated service is moved to the deregistered state by the NF instance when all of the shared services are down. For example, the PCF may update the state of the aggregated service to deregistered when all of the services that make up the aggregated services are unavailable.

Figure 7A:
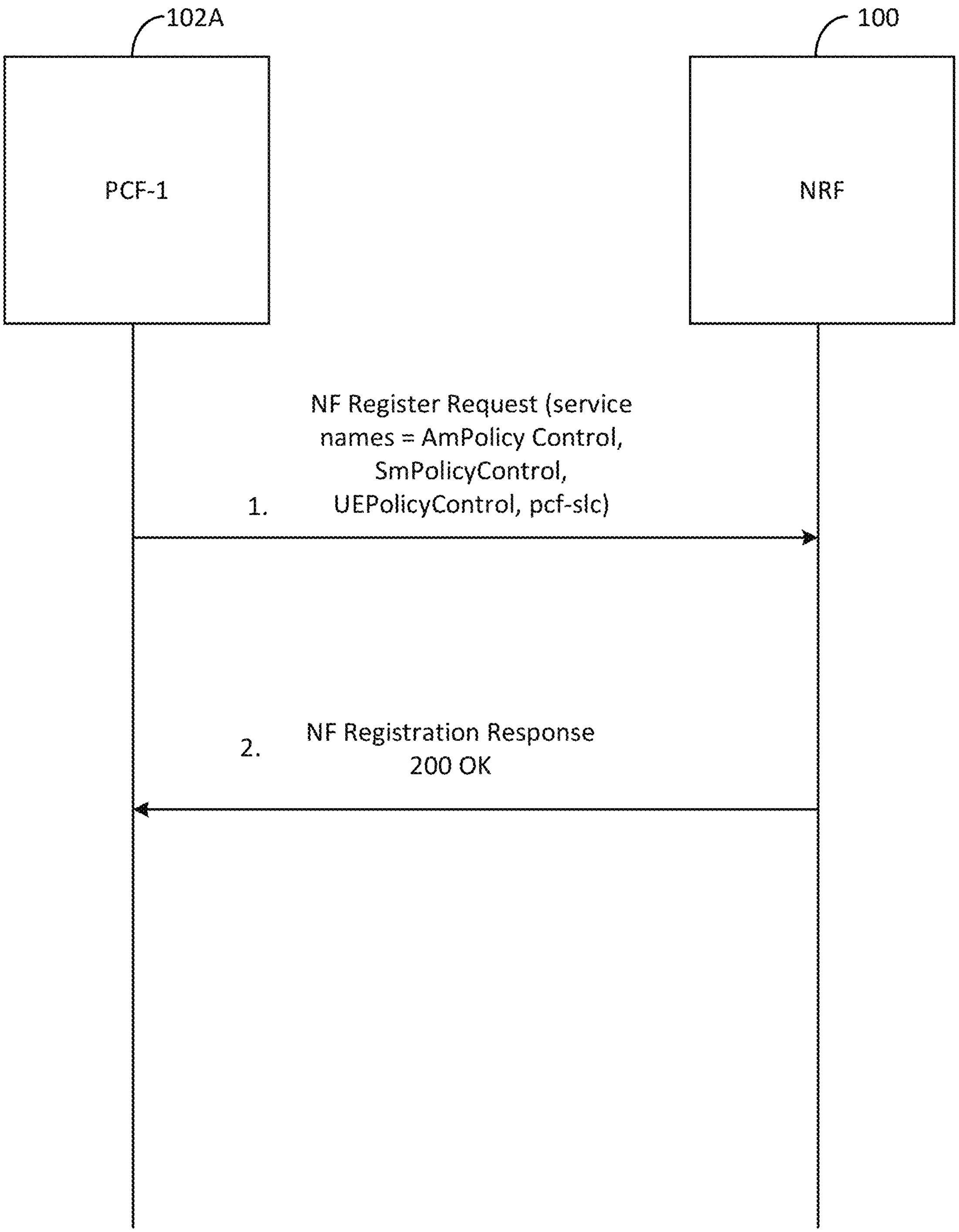
FIG. 7A is a message flow diagram illustrating the use of an aggregated service name in an NF registration operation.

FIG. 7A is a message flow diagram illustrating the use of an aggregated service name in an NF registration service operation. In FIG. 7A, in line 1, PCF-1 102A sends an NF register request to register the NF profile of PCF-1 102A with NRF 100. In the NF register request, PCF-1 102A includes the service name pcf-slc as the aggregated service name for the AM, SM, and UE policy control services provided by the PCF. PCF-1 102A may also include in the NF register request the service names of the individual services that are represented by the aggregated service name. In the illustrated example, the service names for the individual services are the AM, SM, and UE policy control services. NRF 100 registers the NF profile of PCF-1 102A, stores the NF profile of PCF-1 102A in the NF profiles database maintained by NRF 100, and, in line 2, responds to the NF register request indicating successful registration of the NF profile of PCF-1 102A. NRF 100 may separately maintain the registered or unregistered state of each of the services, including the aggregated service. PCF-1 102-A can separately update the state of each of the services, including the aggregated service, by sending NFUpdate messages to the NRF.

Figure 7B:
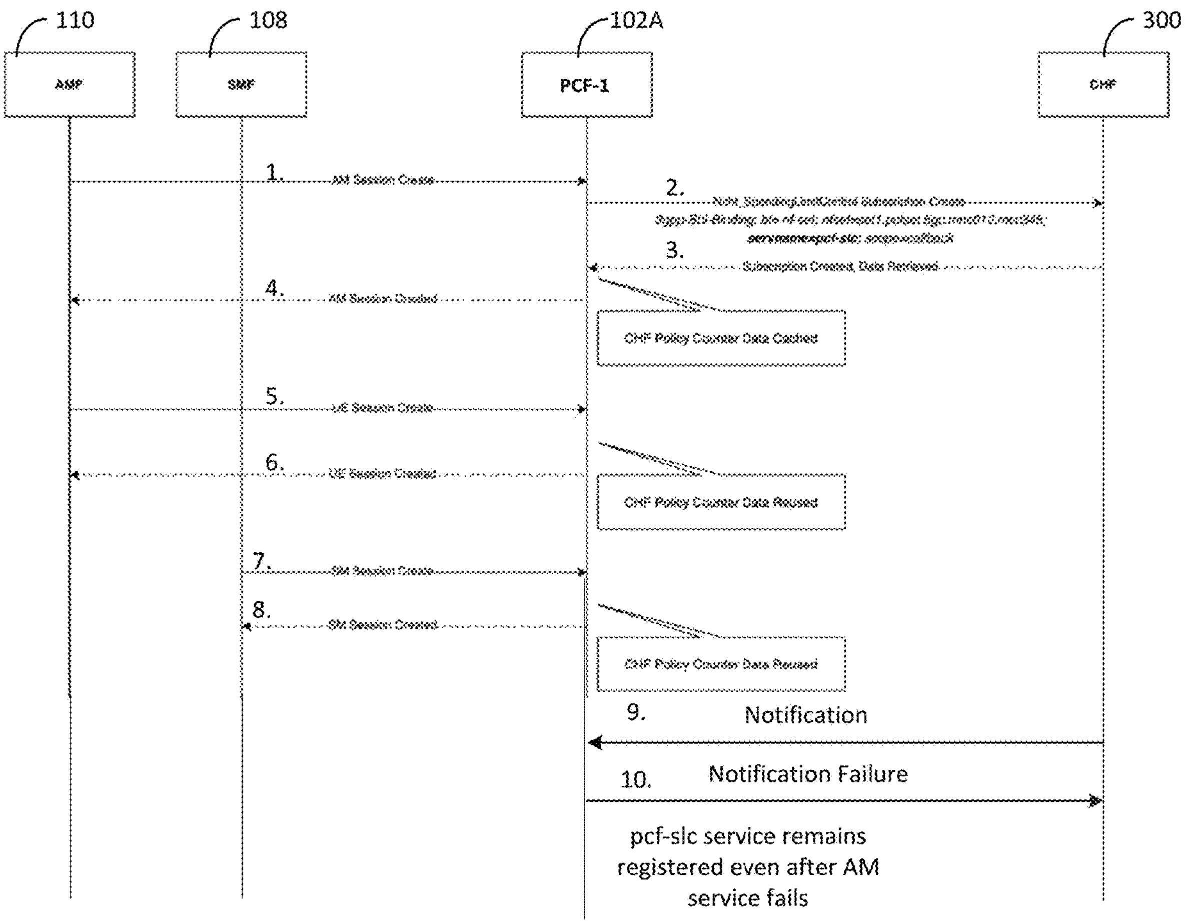
FIG. 7B is a message flow diagram illustrating exemplary messages exchanged in using an aggregated service name in a subscription creation message sent to a CHF.

FIG. 7B is a message flow diagram illustrating exemplary messages exchanged in using an aggregated service name in a subscription creation message sent to a CHF. The aggregated service name is pcf-slc and is the same aggregated service name included in the NF profile registered with the NRF in FIG. 7A. PCF-1 102A maintains the registration status of the aggregated service as registered with NRF 100 even after the AM policy control service becomes unavailable. As a result, CHF 300 or another CHF can use the aggregated service name to query NRF 100 to obtain the NF profiles of PCF instances to provide one or more of the AM, SM, and UE policy control services. The NF profile of the PCF instance with the failed AM policy control service remains discoverable because the SM and UE policy control services are available.

In line 1 of FIG. 7B, AMF 100 requests creation of an AM policy control session with PCF-1 102A. PCF-1 102A receives the request and, in line 2, transmits an Nchf_SpendingLimitControl subscription creation request to CHF 300. In the subscription creation request, PCF-1 102A includes a 3gpp-Sbi-Binding header with a service name identifying the aggregated service that represents aggregation of the AM, SM, and UE policy control services provided by PCF-1 102A. CHF 300 creates the subscription and, in line 3, returns a subscription created message indicating successful creation of the subscription. PCF-1 102A receives the subscription created message from CHF 300, caches the policy counter, and, in line 4, sends an AM session created message to AMF 110.

In line 5, SMF 108 requests creation of a UE policy control session with PCF-1 102A. PCF-1 102A creates the session without a new subscription request to CHF 300. The reason a new subscription request is not required is that PCF-1 102A determines that the policy counter retrieved for the AM policy control session in line 3 can be re-used for the UE session. In line 6, PCF-1 102A responds to SMF 108 indicating successful creation of the UE policy control session.

In line 7, SMF 108 requests creation of an SM policy control session with PCF-1 102A. PCF-1 102A creates the session without a new subscription request to CHF 300. The reason a new subscription request is not required is that PCF-1 102A determines that the policy counter retrieved for the AM policy control session in line 3 can be re-used for the SM session. In line 8, PCF-1 102A responds to SMF 108 indicating successful creation of the SM policy control session.

In lines 9 and 10, a notification from CHF 300 to PCF 102A fails. It is also assumed that the AM policy control service has failed and that NRF 100 has marked the AM service in the NF profile of PCF-1 102A as unregistered or unavailable. However, because PCF-1 102A provided the aggregated service name to CHF 300 in the binding information included with the subscription request message in line 2, CHF 300 can use the aggregated service name to discover producer NF instances to process the failed notification message.

Figure 7C:
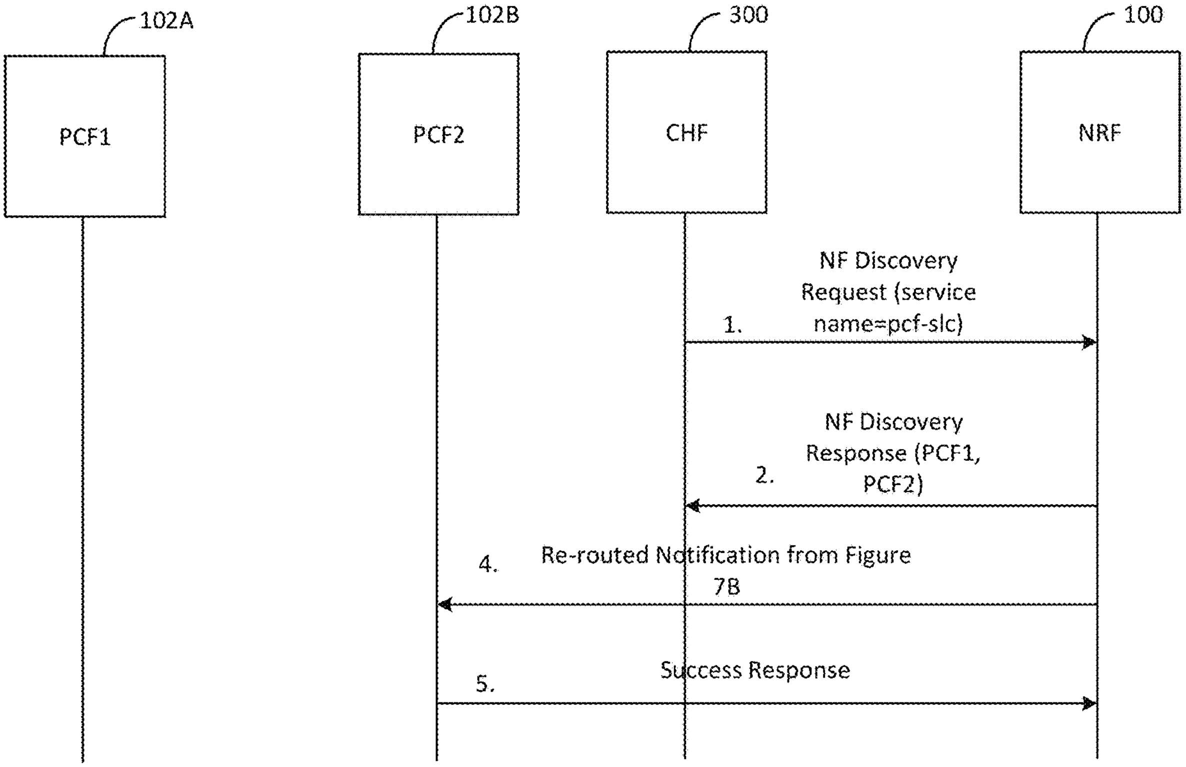
FIG. 7C is a message flow diagram illustrating exemplary messages exchanged in using an aggregated service name to query the NRF for alternate routing of a failed notification message.

FIG. 7C illustrates the use of the aggregated service name by the CHF to obtain a destination for the failed notification in FIG. 7B. In line 1 of FIG. 7C, CHF 300 sends an NF discovery request to NRF 100 and includes as a query parameter in the NF discovery request the aggregated service name obtained from the 3gpp-Sbi-Binding header of the subscription request in FIG. 7C. The NRF receives the NF discovery request, uses the aggregated service names to locate the NF profiles of PCF-1 102A and PCF-2 102B that include the aggregated service name (in an available and/or registered state), and, in line 2, returns the NF profiles in an NF discovery response. CHF 300 selects one of the NF profiles and, in line 3, sends the notification from FIG. 7B for which the notification failed to one of the PCF instances. In the illustrated example, CHF 300 selects PCF-2 102B and sends the notification to PCF-2 102B. It should be noted that the NF profiles of PCF-1 102A and PCF-2 102B are both returned in the NF discovery response because the NF discovery request includes the aggregated service name, and the aggregated service name for both NF profiles has a registered status with the NRF. If both PCF-1 102A and PCF-2 102B are capable of processing the re-routed notification, CHF 300 is provided with routing options that are not available in the scenario described above with regard to FIG. 6. In line 4, PCF-2 102B responds to the notification with a notification completed message.

The user can configure the aggregated service name as an additional service provided by the CHF when creating the PCF NF profile. For example, the NF profile of a PCF can have service names of AM policy control, SM policy control, UE policy control, and pcf-slc, representing the aggregation of the other service types. The PCF can register the NF profile including the aggregated service name with the NRF. The registration of the NF profile with the aggregated service name at the time of installation of PCF or after upgrading the PCF to the supported release using PCF GUI or REST Interface.

The user can configure the custom aggregated service name in the CHF section of a user connector service configuration GUI provided by the PCF. When this configuration is left empty, no service name is used in the binding indication towards CHF.

Figure 7D:
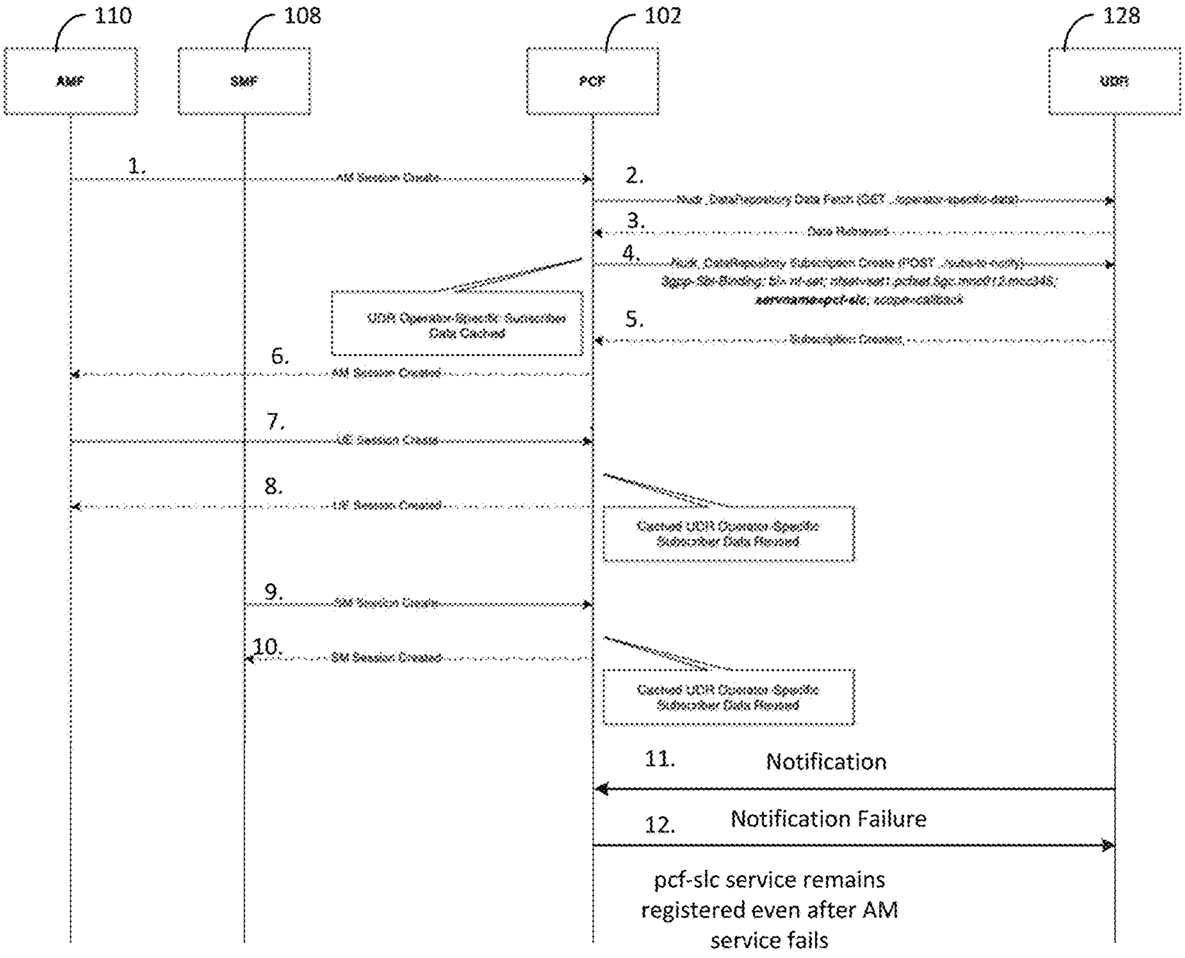
FIG. 7D is a message flow diagram illustrating an example where the PCF uses an aggregated service name when creating a subscription with a UDR.

FIG. 7D is a message flow diagram illustrating an example where the PCF uses an aggregated service name when creating a subscription with a UDR. Referring to FIG. 7D, in line 1, AMF 100 requests creation of an AM policy control session with PCF 102. PCF 102 receives the request and, in line 2, transmits an Nudr_DataRepository Data Fetch request to UDR 128. In line 3, UDR 128 responds with the requested data.

In line 4, PCF 102 transmits an Nudr_DataRepository subscription creation request to UDR 128. In the subscription creation request, PCF 102 includes a 3gpp-Sbi_Binding header with a service name identifying the aggregated service that represents aggregation of the AM, SM, and UE policy control services provided by PCF 102. UDR 128 creates the subscription and, in line 5, returns a subscription created message indicating successful creation of the subscription. PCF 102 receives the subscription created message from UDR 128, caches the operator specific subscriber data, and, in line 6, sends an AM session created message to AMF 110.

In line 7, SMF 108 requests creation of a UE policy control session with PCF 102. PCF 102 creates the session without a new subscription request to UDR 128. The reason a new subscription request is not required is that PCF 102 determines that the operator-specific subscriber data retrieved for the AM policy control session in line 5 can be re-used for the UE session. In line 8, PCF 102 responds to SMF 108 indicating successful creation of the UE policy control session.

In line 9, SMF 108 requests creation of an SM policy control session with PCF 102. PCF 102 creates the session without a new subscription request to UDR 128. The reason a new subscription request is not required is that PCF 102 determines that the operator-specific subscriber data retrieved for the AM policy control session in line 5 can be re-used for the SM session. In line 10, PCF 102 responds to SMF 108 indicating successful creation of the SM policy control session.

In lines 11 and 12, a notification from UDR 128 to PCF 102 fails. It is also assumed that the AM policy control service has failed and that NRF 100 has marked the AM service in the NF profile of PCF 102 as unregistered or unavailable. However, because PCF 102 provided the aggregated service name to UDR 128 in the binding information included with the subscription request message in line 2, UDR 128 can use the aggregated service name to discover producer NF instances to process the failed notification message.

Although in the examples illustrated in FIG. 7A-7D, the NF providing service aggregation is a PCF, the subject matter described herein is not limited to providing service aggregation by a PCF. Any NF that can obtain resource data from another NF and use that resource data to respond to requests from consumer NFs is intended to be within the scope of the subject matter described herein. In addition to a PCF, another example of an NF that can provide service aggregation is the AMF. The AMF can obtain resource data, such as UE location information, from a UDM for more than one service provided by the AMF and provide the location information to consumer NFs, such as short message service functions (SMSFs) and UDRs. Examples of such services that may be provided by the AMF include Namf_MT service and Namf_Location service, as described in 3GPP TS 29.518. In such a case, the AMF may register an aggregated service name with the NRF and maintain a registered status of the aggregated service name as long as one of the services represented by the aggregated service name remains available. The AMF may communicate the aggregated service name to the UDM in a 3gpp-Sbi-Binding header, as described above for the aggregated service name for the PCF services. The UDM may utilize the aggregated service name for alternate routing to the AMF, even when one or more of the services provided by the AMF become unavailable.

Figure 8:
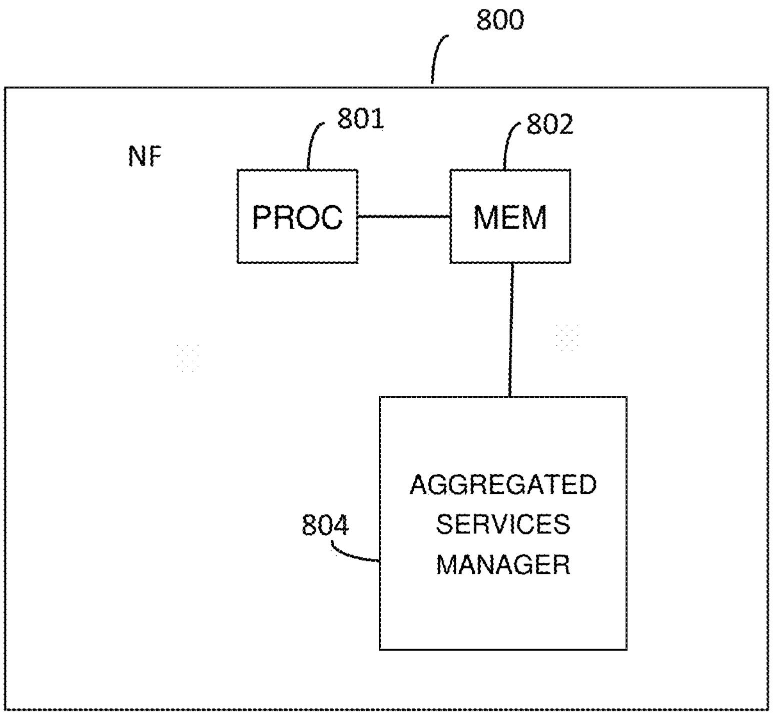
FIG. 8 is a block diagram illustrating an exemplary architecture of an NF for using an aggregated service name in NF registration and in 3gpp-Sbi-Binding headers.

FIG. 8 is a block diagram illustrating an exemplary architecture of an NF for using an aggregated service name in NF registration and in 3gpp-Sbi-Binding headers. In FIG. 8, NF 800 includes at least one processor 801 and a memory 802. NF 800 further includes an aggregated services manager 804 that registers an NF profile of NF 800 that includes an aggregated service name with the NRF, maintains a registered state of the aggregated service name as long as one of the aggregated services is available, and includes the aggregated service name in 3gpp-Sbi-Binding headers communicated to NF service producers, such as UDMs and CHFs. Aggregated services manager 804 also manages shared resources, such as policy counters, utilized by the aggregated services. Aggregated services manager 804 may be implemented using computer executable instructions stored in memory 802 and executed by processor 801.

Figure 9:
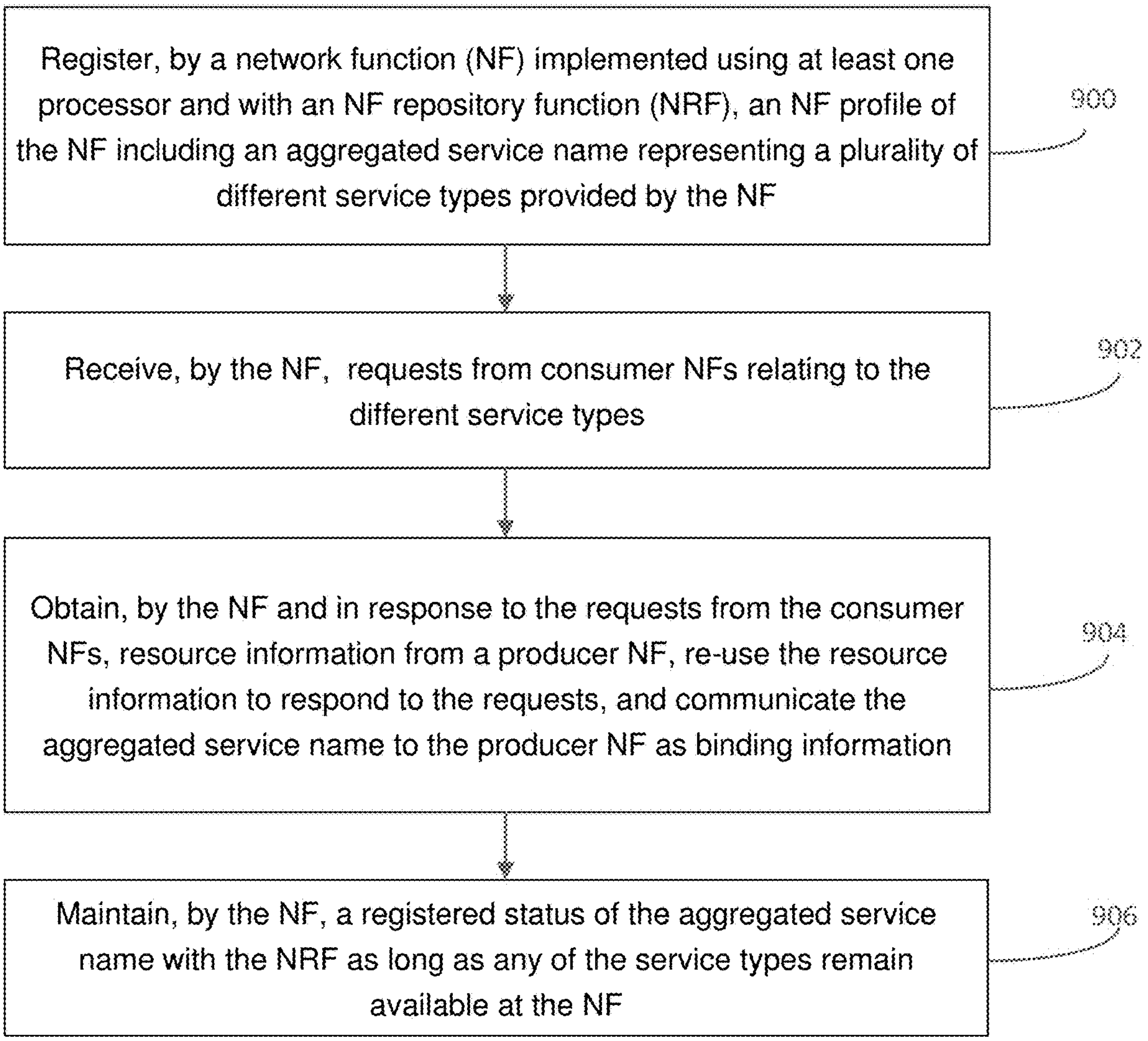
FIG. 9 is a flow chart illustrating an exemplary process performed by an NF for using an aggregated service name in NF registration and 3gpp-Sbi-Binding headers.

FIG. 9 is a flow chart illustrating an exemplary process performed by an NF for using an aggregated service name in NF registration and 3gpp-Sbi-Binding headers. Referring to FIG. 9, in step 900, the process includes registering, by an NF implemented using at least one processor and with an NRF, an NF profile of the NF including an aggregated service name representing a plurality of different service types provided by the NF. For example, aggregated services manager 804 of NF 800 may register the NF profile of NF 800 with NRF 100 and include, in the NF profile, an aggregated service name that represents the AM policy control, SM policy control, and UE policy control services. The NF profile may also include the services names for the individual policy control services. The NF profile may also include a registration status (e.g., registered or unregistered) for the aggregated service and the individual service names. In another example, an AMF may register its NF profile with the NRF, and the aggregated service name may represent the various services, such a Namf_MT and Namf_Location service provided by the AMF.

In step 902, the process further includes receiving, by the NF, requests from consumer NFs relating to the different service types. For example, aggregated services manager 804 of NF 800 may receive messages from consumer NFs for creating one of an SM policy control session, an AM policy control session, a UE policy control session, and/or an aggregated policy control session and may create sessions responsive to the requests. If a consumer NF can consume multiple service types, the consumer NF may send a single session creation request to the NF 800, where the session creation request identifies the aggregated service type. In addition, the PCF illustrated in FIG. 7B could send a single subscription request to the CHF (for spending limit control resource data) using the aggregated policy control service instead of sending separate messages for the SM and UE policy control services. Allowing the consumer NF to subscribe to the aggregated service type instead of sending multiple messages for each of the individual service types can be advantageous because it reduces the messaging in the network required for creating subscriptions in the network. If NF 800 is an AMF, the request from consumer NFs may be a request for the Namf_MT and Namf_Location services.

In step 904, the process further includes, obtaining, by the NF, and in response to the requests from the consumer NFs, resource information from the producer NF, re-using the resource information to respond to the requests, and communicating the aggregated service name to the producer NF as binding information. For example, aggregated services manager of NF 800 may send a single subscription request to a producer NF, such as CHF 300, in response to a first session creation request for the shared resource. The subscription creation request may include a 3gpp-Sbi-Binding header with the aggregated service name in the header. Aggregated services manager 804 of NF 800 may receive resource information, such as a policy counter from CHF 300 or operator-specific subscriber data, from a UDR and may allow all of the sessions to consume the resource represented by the shared resource information. In another example, if NF 800 is an AMF, NF 800 may obtain location information from a UDR, and the AMF may use the location information to respond to requests from consumer NFs relating to the Namf_MT and Namf_Location services.

In step 906, the process further includes maintaining, by the PCF, a registered status of the aggregated service name with the NRF as long as any of the service types remain available at the PCF. For example, aggregated services manager 804 of PCF 800 may continually update its NF profile with the NRF to keep the aggregated service name indicated as registered as long as one or more of the aggregated services represented by the aggregated service name remain available.

Exemplary advantages of the subject matter described herein include the providing of improved binding information to a producer NF, which enables the producer NF or another producer NF to discover a consumer NF instance, even if some, but not all, of the services provided by the consumer NF instance become unavailable The disclosure of each of the following references is hereby incorporated herein by reference in its entirety.

REFERENCES 1. 3rd Generation Partnership Project; Technical Specification Group Core Network and Terminals; 5G System; Network Function Repository Services; Stage 3 (Release 18) 3GPP TS 29.510 V18.4.0 (2023-09)
2. 3rd Generation Partnership Project; Technical Specification Group Core Network and Terminals; 5G System; Technical Realization of Service Based Architecture; Stage 3 (Release 18) 3GPP TS 29.500 V18.3.0 (2023-09)
3. 3rd Generation Partnership Project; Technical Specification Group Core Network and Terminals; 5G System; Spending Limit Control Services; Stage 3 (Release 18) 3GPP TS 29.594 V18.2.0 (2023-09)
4. 3rd Generation Partnership Project; Technical Specification Group Core Network and Terminals; 5G System; Access and Mobility Management Services; Stage 3 (Release 18) 3GPP TS 29.518 V18.3.0 (2023-09)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for service aggregation for alternate routing of callback messages, the method comprising:

registering, by a network function (NF) implemented using at least one processor and with an NF repository function (NRF), an NF profile of the NF including an aggregated service name representing a plurality of different service types provided by the NF;

receiving, by the NF, requests from consumer NFs relating to the different service types;

obtaining, by the NF and in response to the requests from the consumer NFs, resource information from a producer NF, re-using the resource information to respond to the requests, and communicating the aggregated service name to the producer NF as binding information; and maintaining, by the NF, a registered status of the aggregated service name with the NRF as long as any of the service types remain available at the NF.

2. The method of claim 1 wherein the NF comprises a policy control function (PCF) and the plurality of different service types provided by the PCF include user equipment (UE) policy control, session management function (SM) policy control, and access and mobility management function (AM) policy control services.

3. The method of claim 2 wherein registering the NF profile including the aggregated service name with the NRF includes registering the NF profile including the aggregated service name representing the UE, AM, and SM policy control service types.

4. The method of claim 2 wherein communicating the aggregated service name as binding information to the producer NF includes communicating the aggregated service name representing the UE, AM, and SM policy control services as part of a 3gpp-Sbi-Binding header.

5. The method of claim 1 wherein the requests from the consumer NFs comprise session creation requests, one of the session creation requests from one of the consumer NFs includes the aggregated service name, and creating the sessions with the consumer NFs includes creating a session for the aggregated service name with the one consumer NF.

6. The method of claim 1 wherein the requests from the consumer NFs comprise session creation requests for creating sessions with the NF for the different service types and obtaining the resource information from the producer NF includes creating a single subscription with the producer NF for the sessions with the consumer NFs.

7. The method of claim 1 wherein re-using the resource information includes consuming a resource represented by the resource information based on usage by sessions with the consumer NFs.

8. The method of claim 1 wherein the NF comprises an access and mobility management function (AMF) and the producer NF comprises a unified data management (UDM) function.

9. The method of claim 1 wherein the producer NF comprises a charging function (CHF) and re-using the resource information includes re-using a policy counter provided by the CHF.

10. The method of claim 1 wherein the producer NF comprises a unified data repository (UDR) and re-using the resource information includes re-using operator-specific subscriber data received from the UDR.

11. A system for service aggregation for alternate routing of callback messages, the system comprising:

a network function (NF) including at least one processor; and an aggregated services manager implemented by the at least one processor for registering, with an NF repository function (NRF), an NF profile of the NF including an aggregated service name representing a plurality of different service types provided by the NF, receiving requests from consumer NFs relating to the different service types, obtaining resource information from a producer NF, re-using the resource information to respond to the requests, communicating the aggregated service name to the producer NF as binding information, and maintaining a registered status of the aggregated service name with the NRF as long as any of the service types remain available at the NF.

12. The system of claim 11 wherein the NF comprises a policy control function (PCF) and the plurality of different service types provided by the PCF include user equipment (UE) policy control, session management function (SM) policy control, and access and mobility management function (AM) policy control services.

13. The system of claim 12 wherein the aggregated services manager is configured to register the NF profile including with the aggregated service name representing the UE, AM, and SM policy control service types.

14. The system of claim 11 wherein the aggregated services manager is configured to communicate the aggregated service name as part of a 3gpp-Sbi-Binding header.

15. The system of claim 11 wherein the requests from the consumer NFs comprise session creation requests and the aggregated services manager is configured to obtain the resource information by creating a single subscription with the producer NF for sessions with the consumer NFs.

16. The system of claim 11 wherein the requests from the consumer NFs comprise session creation requests for creating sessions with the NF for the different service types, one of the session creation requests from one of the consumer NFs includes the aggregated service name, and the aggregated services manager is configured to create a session for the aggregated service name with the one consumer NF.

17. The system of claim 11 wherein the NF comprises an access and mobility management function (AMF) and the producer NF comprises a unified data management (UDM) function.

18. The system of claim 11 wherein the producer NF comprises a charging function (CHF) and the aggregated services manager is configured to re-use a policy counter provided by the CHF.

19. The system of claim 11 wherein the producer NF comprises a unified data repository (UDR), and the aggregated services manager is configured to re-use operator-specific subscriber data received from the UDR.

20. A non-transitory computer readable medium having stored thereon executable instructions that when executed by a processor of a computer control the computer to perform steps comprising:

registering, by a network function (NF) implemented using at least one processor and with an NF repository function (NRF), an NF profile of the NF including an aggregated service name representing a plurality of different service types provided by the NF;

receiving, by the NF, requests from consumer NFs relating to the different service types;

obtaining, by the NF, and in response to the requests from the consumer NFs, resource information from a producer NF, re-using the resource information to respond to the requests, and communicating the aggregated service name to the producer NF as binding information; and maintaining, by the NF, a registered status of the aggregated service name with the NRF as long as any of the service types remain available at the NF.

* * * * *